United States Patent
Durand et al.

(10) Patent No.: US 7,774,673 B2
(45) Date of Patent: Aug. 10, 2010

(54) DECODING DEVICE, ADAPTED FOR A TRANSMISSION SYSTEM USING DIRECT SEQUENCE SPREAD SPECTRUM

(75) Inventors: Benoit Durand, Rousset (FR); Christophe Fraschini, La Garde (FR)

(73) Assignees: STMicroelectronics SAS, Rousset (FR); Universite de Provence, Marseilles (FR)

( * ) Notice: Subject to any disclaimer, the term of this patent is extended or adjusted under 35 U.S.C. 154(b) by 1283 days.

(21) Appl. No.: 11/268,678

(22) Filed: Nov. 7, 2005

(65) Prior Publication Data

US 2006/0209929 A1 Sep. 21, 2006

(30) Foreign Application Priority Data

Nov. 8, 2004 (FR) .................................. 04 11881

(51) Int. Cl.
*H03M 13/00* (2006.01)
(52) U.S. Cl. ............... 714/752; 714/760; 714/E11.057; 714/731; 714/814; 375/343; 375/350
(58) Field of Classification Search ................. 714/752, 714/760, E11.057, 731, 814; 375/343, 350
See application file for complete search history.

(56) References Cited

U.S. PATENT DOCUMENTS

| 6,154,487 A | * | 11/2000 | Murai et al. ................. 375/150 |
| 6,211,919 B1 | * | 4/2001 | Zink et al. ................... 348/473 |
| 6,590,881 B1 | * | 7/2003 | Wallace et al. .............. 370/332 |
| 2003/0227963 A1 | | 12/2003 | Dafesh ........................ 375/149 |

\* cited by examiner

*Primary Examiner*—Scott T Baderman
*Assistant Examiner*—Enam Ahmed
(74) *Attorney, Agent, or Firm*—Lisa K. Jorgenson; Timothy L. Boller; Seed IP Law Group PLLC

(57) ABSTRACT

The invention relates to a decoding device particularly adapted to decode a digital input signal (E) in a transmission system using direct sequence spread spectrum, this digital input signal (E) being composed of symbols, each symbol representing a bit satisfying a Barker code, and comprising several symbol elements.

This device comprises several finite response filters (FLT1 to FLT4) each of which receives the digital input signal (E), a clock circuit (CLK_GEN) outputting clock signals (CLK1 to CLK4) to the filters with a frequency equal to the frequency at which symbol elements are produced and uniformly distributed phase shifts, and an analysis circuit (ANL) designed to identify which of the filters is best tuned to the input signal (E) and to control the clock circuit to make it generated a clock signal (CLK5) optimised for decoding and an analysis circuit.

22 Claims, 4 Drawing Sheets

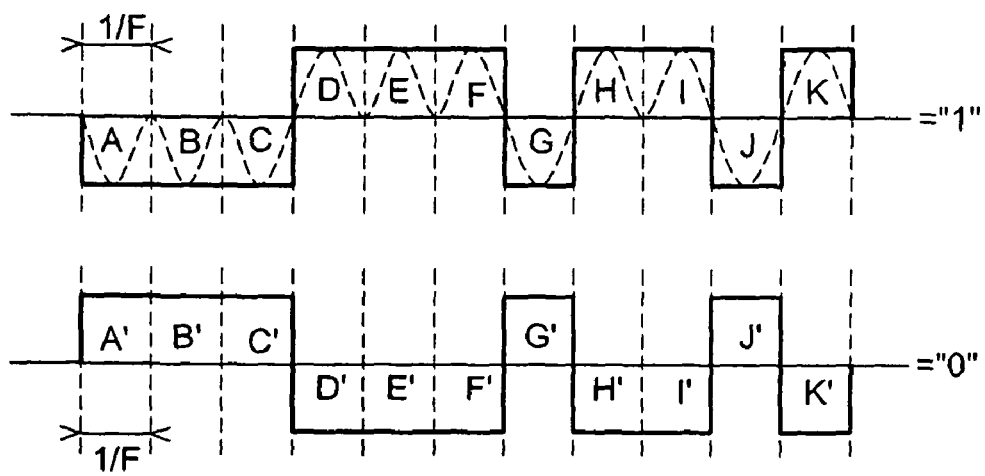
Fig. 1
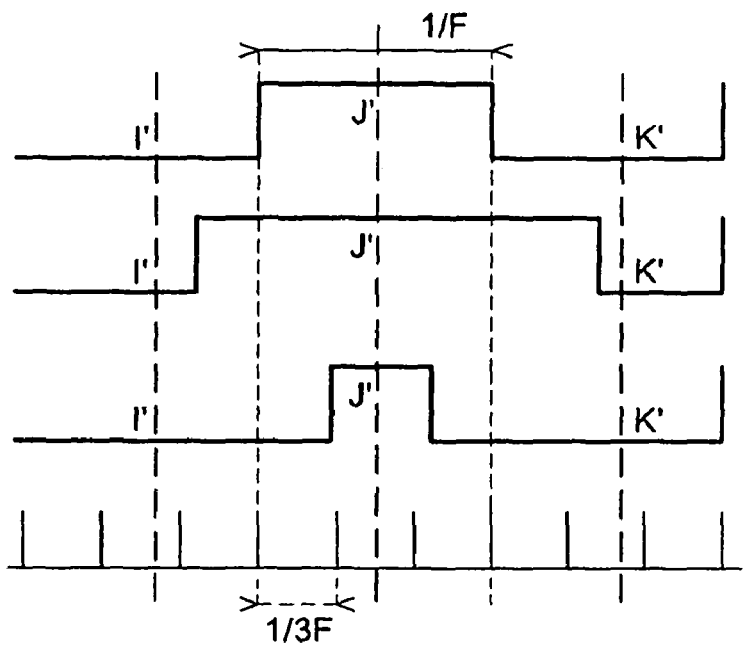
Fig. 2A
Fig. 2B
Fig. 2C
Fig. 2D

DECODING DEVICE, ADAPTED FOR A TRANSMISSION SYSTEM USING DIRECT SEQUENCE SPREAD SPECTRUM

The invention relates in general to decoding techniques for digital signals in base band.

More precisely, the invention relates to a decoding device particularly adapted to a transmission system using direct sequence spread spectrum to decode a digital input signal in base band composed of bits, each bit being represented by one of two symbols depending on its value, for example satisfying a Barker code, each symbol being composed of a series of N symbol elements distributed on one of two different levels and output at a predetermined fixed frequency with possible individual variations in phase and duration, and the N symbol elements of the first symbol being anti-correlated to the N corresponding symbol elements in the second symbol, this device comprising at least one finite response filter and a clock circuit.

In a system for transmission of a digital signal using direct sequence spread spectrum, the "0" and "1" bits are coded by corresponding symbols sent by the emitter and decoded at the receiver by a finite response filter.

If the bits are coded using a Barker code with length N, the symbols coding the "0" and "1" bits are each in the form of a series of N symbol elements distributed on one of two different levels and output at a predetermined fixed frequency F.

Thus, for a Barker code with length N=11, each symbol is composed of 11 symbol elements such as A to K and A' to K' represented by solid lines in FIG. 1 for a "1" bit and for a "0" bit respectively.

The N symbol elements coding the "1" bit are anti-correlated to the N corresponding symbol elements coding the "0" bit, in other words the symbol elements with the same rank in each of these two symbols have opposite values.

For example, if the symbol element D of the symbol coding the "1" bit is at level 1, the corresponding symbol element D' of the symbol coding the "0" bit is at level −1. Similarly, if the symbol element G of the symbol coding the "1" bit is at level −1, the corresponding symbol element G' of the symbol coding the "0" bit is at level 1.

If the symbols used satisfy a Barker code, their length N will be equal to 2, 3, 4, 5, 7, 11 or 13.

Furthermore, each symbol element with order "i" is output at a level $n_i$ equal to 1 or −1 such that:

$$|\Sigma_{i-1}^{N-k} n_1 - n_{i+k}| \leq 1$$

When the digital signal reaches the receiver, the finite response filter in the receiver correlates the levels of the symbol elements, for example denoted A" to K" that it receives successively on its input, at the levels of the successive symbol elements of one of the two symbols, for example symbol elements A to K of the symbol coding the "1" bit, and outputs an output signal with an amplitude representative of the observed correlation level.

For example if this filter receives symbol elements "A" to "K" in sequence composed identically of symbol elements A' to K', the output signal from it correlating these symbol elements to symbol elements A to K will have an amplitude equal to −11, this total being represented by the sum of the 11 elementary anti-correlation values equal to −1, the first of which represents the anti-correlation between A" (level 1) and A (level −1), the second of which represents the anti-correlation between B" (level 1) and B (level −1), etc., and the eleventh of which represents the anti-correlation between K" (level −1) and K (level 1).

If this filter receives symbol elements A" to J" in sequence consisting of symbol elements A' to J' identically and a last symbol element K" equal to zero as a result of a transmission problem, the output signal from it correlating these symbol elements to symbol elements A to K will only have an amplitude equal to −10, since the symbol element K" does not make any contribution to this output signal.

Obviously, the situation will be exactly the same if the missing symbol element was any of the other symbol elements, and not K".

Similarly, if for example this filter receives the symbol elements A" to I" in sequence consisting of the symbol elements A to I identically, and the last two symbol elements J" and k" equal to zero as a result of a transmission problem, the amplitude of the output signal from it correlating these symbol elements to symbol elements A to K would be equal to +9, this total being represented by the sum of the 9 elementary correlation values equal to +1, the first of which represents the correlation between A" (level −1) and A (level −1), the second of which represents the correlation between B" (level −1) and B (level −1), etc., and the ninth of which represents the correlation between I" (level 1) and I (level 1), but the symbol elements J" and k" do not make any contribution to this output signal.

Obviously, the situation would be exactly the same if the missing symbol elements were any other two symbol elements, and not J" and k".

It will thus be understood that, to a certain extent, this known coding process overcomes difficulties caused by transmission faults.

In the above example, the output signal from the finite response filter may be output to a specific comparator capable of comparing the amplitude of this output signal with a lower threshold value, for example fixed at −8, and with a threshold value for example fixed at +8.

Under these conditions, this comparator will treat reception of successive symbol elements A" and k" with only 8 symbol elements correlated to symbol elements A to K (instead of 11) with a symbol coding the "1" bit, and reception of successive symbol element A" and k" with only 8 anti-correlated symbol elements anti-correlated to symbol elements A to K (instead of 11) with a symbol coding the "0" bit.

In reality, the decoding process is not quite as simple as was described above for several reasons.

The first reason is that the process described above can only operate as described above if each symbol element in the input digital signal is sampled at an appropriate instant.

Symbol elements such as A to K and A' to K' do not all specifically have a theoretical and ideal form as illustrated in FIG. 1 in solid lines, but they are more in the form of pulses for which the amplitude temporarily passes through an extreme as illustrated in chain dotted lines in the same figure for bit "1".

However, communication systems using the technique described above are asynchronous, such that it is impossible to know in advance the precise instant at which each symbol element must be sampled to be picked up at its extreme value.

In prior art, this problem is solved by oversampling the input digital signal as shown in FIG. 2, particularly by its diagrams 2A and 2D.

Diagram 2A provides an ideal example of the last three symbol elements I' to K' of the symbol coding the "0" bit in the case in which the symbol is coded with a Barker code with length 11, these symbol elements being sent and received at the fixed frequency F.

Diagram 2D shows an example representing the instants at which these symbol elements are sampled at a multiple frequency of the fixed frequency F, in this case equal to 3×F, the fact that the start time of the symbol elements I' to K' coincides with sampling times obviously being completely accidental and representing only one possible limiting case.

In theory, this oversampling technique can give at least three correct samples of the received digital signal for each symbol element of this signal, and therefore a priori can overcome the first difficulty mentioned above.

However, apart from the fact that oversampling increases the complexity and the surface area of the circuits used, there is a second difficulty with this known technique illustrated in diagrams 2B and 2C in FIG. 2.

This additional difficulty is due to the fact that, under some conditions, the duration of each symbol element such as J' may vary around the value T =1/F even if there is no variation in the average period of the symbol elements.

This phenomenon is illustrated in diagrams 2A to 2C in FIG. 2, on which the short vertical dashed lines represent time interval limits equal to T =1/F, where F is the fixed emission frequency of symbol elements such as I', J' and K', while the long vertical dashed lines show the mid-points of these time intervals.

In the case of diagram 2A, symbol elements I' to K' have a common duration exactly equal to their theoretical duration T =1/F.

In the case of diagram 2B, the symbol element J' has a duration longer than its theoretical duration T, symbol elements I' and K' have a shorter duration than their theoretical duration T and for example equal to ⅔ of this theoretical duration.

In this case it is said that the "eye" at the symbol element J' is 100% open because this symbol element covers at least its entire theoretical duration, while the eye at each of the symbol elements I' and K' is only 66% open.

In the case of diagram 2C, the symbol element J' has a shorter duration than its theoretical duration T, for example equal to ⅔ of this theoretical duration, the symbol elements I' and K' then having a longer duration than their theoretical duration T.

In this case, the eye at each of the symbol elements I' and K' is 100% open, while the eye at symbol element J' is only 66% open.

The problem is that the oversampling technique used in prior art leads to a very delicate compromise about the adjustment of comparator threshold values associated with the finite response filter.

More precisely, in order to be able to correctly decode symbols of an input signal modified by partial closing of the eye, the lower and upper comparator thresholds must be adjusted to their extreme values, in other words greater than or equal to 10 and less than or equal to −10 in the case of a Barker code with length N equal to 11, such that any transmission fault of a single symbol element makes it impossible to recognise the symbol to which this symbol element belongs.

Conversely, in order to be able to correctly decode symbols of an input signal modified by transmission faults of some symbol elements, which leads to adjusting the lower and upper thresholds of the comparator to intermediate values, for example greater than or equal to 7 and less than or equal to −7 for a Barker code with a length N equal to 11, it is essential that the input signal is not correspondingly modified by partial closing of the eye, otherwise this will be considered as an error.

In this context, the purpose of the invention is to propose a device capable of correctly decoding an asynchronous digital signal affected by one or several transmission faults and corrupted by partial closure of the eye.

To achieve this, the device according to the invention, that is otherwise conforming with the generic definition given in the above preamble, is characterised essentially in that it comprises a plurality M of finite response base filters each of which receives the digital input signal, and in that the clock circuit outputs a plurality M of clock signals to the M base filters with a common frequency equal to the fixed frequency and corresponding phase shift uniformly distributed between these M clock signals, in that these base filters are clocked to capture the corresponding samples of the input digital signal at the instants at which their corresponding clock signals reach a predetermined phase angle common to all the filters, in that each base filter outputs an output signal at its output at each period of its clock signal, the amplitude of the output signal being a function of the correlation level, representing a variable resemblance between the sequence of the last N samples picked up by this base filter and the series of N symbol elements of the first symbol, and in that this device comprises an analysis circuit connected to the output from each base filter, this analysis circuit being capable of identifying which of the M base filters produces an output signal with a maximum amplitude and/or a minimum amplitude, over a time interval equal to at least the duration of a symbol, and by default to specify the clock signal received by the base filter as the optimum clock signal for decoding.

Preferably, the analysis circuit uses the clock signal received by one base filter among the M base filters, chosen such that the difference between the maximum amplitude and minimum amplitude of its output signal is greatest over a time interval equal to at least the duration of a symbol, as the optimum clock signal for decoding.

Advantageously, the decoding device according to the invention comprises an additional finite response filter receiving the digital input signal parallel to the base filters and the clock circuit is controlled by the analysis circuit to output the optimum clock signal to this additional filter, the additional filter also being clocked to pick up a sample of the digital input signal at the instants at which the optimum clock signal reaches the predetermined phase angle common to all filters, and to produce an output signal for which the absolute value of the amplitude is at least as large as the amplitude of the output signals of the base filters, at each period of the optimum clock signal.

The device according to the invention may also comprise a comparator installed on the output of the additional filter, capable of comparing the amplitude of the output signal from the additional filter with a lower threshold value and an upper threshold value, and outputting a first bit as the digital output signal representing a decoded symbol of the input signal when the amplitude of the output signal from the additional filter is greater than the value of the upper threshold, and a second bit when the amplitude of the output signal from the additional filter is less than the value of the lower threshold, the values of the upper and lower thresholds of this comparator preferably being adjustable.

According to one first possible embodiment of the invention, the analysis circuit may include at least N·M memory cells to store at least the N last successive samples of the output signal from each of the M base filters, this analysis circuit thus having the minimum value and the maximum value of the amplitude of the output signal from each base filter over the duration of a symbol, at the end of each period corresponding to the predetermined fixed frequency.

However, it is also possible to have a second embodiment of the invention in which the analysis circuit comprises at least M pairs of memory cells, each of which is specifically dedicated to one of the M base filters, the first cell of each pair of cells being used by the analysis circuit to store the last known minimum value of the output signal amplitude from the filter to which this pair of cells is dedicated, and the second cell of each pair of cells is used by the analysis circuit to store the last known maximum value of the amplitude of the output signal from the filter to which this pair of cells is dedicated, this analysis circuit thus having the minimum value and the maximum value of the amplitude taken on by the output signal from each base filter over the duration of a symbol, at the end of each period in a series of successive observation periods each of which is equal to at least the duration of a symbol.

Thus for example, the decoding device according to the invention may comprise at least four base filters, the clock signal output to each base filter having a phase advance and a phase delay respectively equal to not more than 90 degrees with respect to the clock signals output to two other base filters.

Other characteristics and specific features of the invention will become clearer from the description given below for information and that is in no way restrictive, with reference to the appended figures, wherein:

FIG. 1 is composed of two time diagrams, the first of which diagrammatically shows a symbol coding a "1" bit in the Barker code with length 11, and the second of which diagrammatically shows a symbol coding a "0" bit in this same code;

FIG. 2 is composed of four time diagrams, the first (2A) of which shows the last three elements of symbols I' to K' in FIG. 1 in the case in which the eye of these symbol elements is 100% open, the second (2B) of which represents these same three symbol elements I' to K' in the case in which the eye of symbol elements I' and K' is only 66% open, the third (2C) of which represents these same three symbol elements I' to K' in the case in which the eye of the symbol element J' is only 66% open, and the fourth (2D) of which materialises the input signal sampling instants at a frequency 3.F greater than the frequency F at which the symbol elements I' to K' are produced;

As mentioned above, the invention relates to a decoding device, particularly a device adapted to a transmission system using a direct sequence spread spectrum.

This device is designed to decode a digital input signal E in base band composed of bits each of which is represented by one of the two symbols depending on its value "1" or "0", as illustrated in FIG. 1, in the special case in which these symbols satisfy a Barker code with length 11.

More generally, the invention is applicable to the case in which each symbol is composed of a series of N symbol elements such as A to K or A' to K', distributed on one of two different levels.

These symbol elements are output at a predetermined fixed frequency F corresponding to a predetermined period $T = 1/F$, with possible individual phase and duration variations, and the N symbol elements A to K of the symbol coding the "1" bit are anti-correlated to the N corresponding symbol elements A' to K' of the symbol coding the "0" bit.

Figure 3:
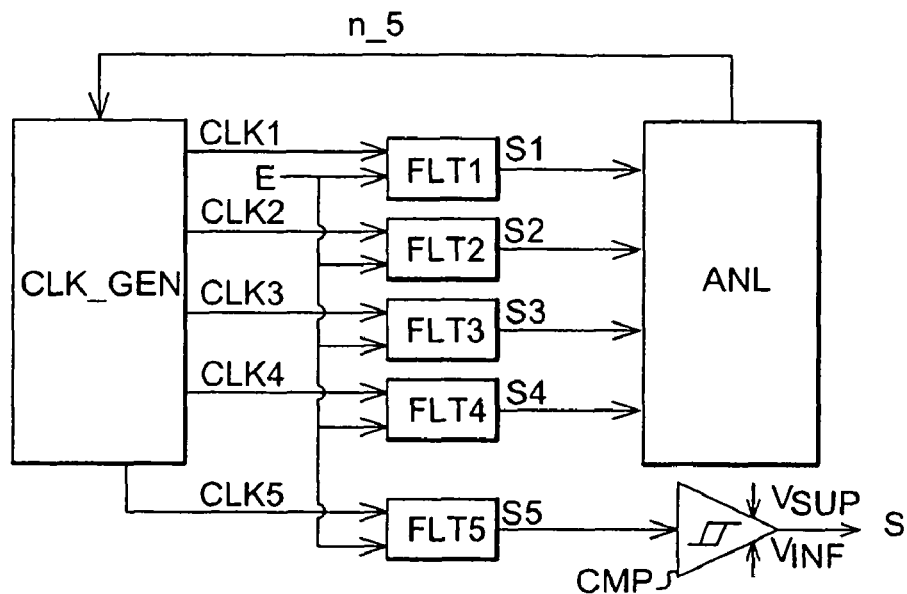
FIG. 3 shows a diagram representing a device according to the invention.

The device according to the invention essentially (FIG. 3) comprises a clock circuit GEN_CLK, a number M greater than 1 of finite response base filters, for example four filters FLT1 to FLT4, and an analysis circuit ANL.

Preferably, this device also comprises an additional finite response filter FLT5 and a comparator CMP connected to the output from this additional filter.

Each of the finite response filters, namely filters FLT1 to FLT5, receives the digital input signal E to be decoded in parallel to the others.

Figure 4:
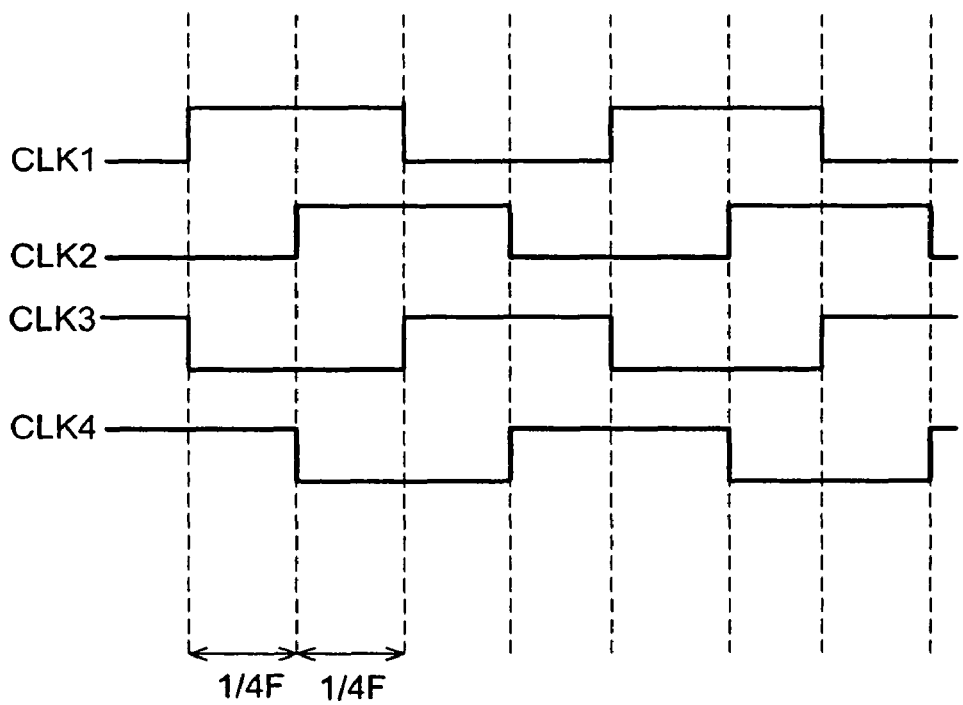
FIG. 4 is composed of four time diagrams representing the different clock signals output to the different base filters of the device according to the invention.

In particular, the clock circuit CLK_GEN has the function of outputting a corresponding plurality M of clock signals CLK1 to CLK4 to the M base filters FLT1 to FLT4 respectively (FIG. 4).

These clock signals CLK1 to CLK4 have a common frequency equal to the fixed frequency F at which the symbol elements A to K and A' to K' are produced.

On the other hand, these clock signals CLK1 to CLK4 have corresponding uniformly distributed phase shifts that are therefore staged in steps of 90 degrees if four base filters FLT1 to FLT4 are used.

Thus as shown in FIG. 4, the clock signal CLK1 in this case is in phase advance of 90 degrees (in other words 360°/M) with respect to the clock signal CLK2, which is itself 90 degrees in advance of the clock signal CLK3, which is itself 90 degrees in advance of the clock signal CLK4, which is therefore 90 degrees in advance of the clock signal CLK1, except for one period T.

The additional filter FLT5 receives a clock signal CLK5 composed of one of the clock signals CLK1 to CLK4 chosen according to a procedure that will be described later.

Figure 5:
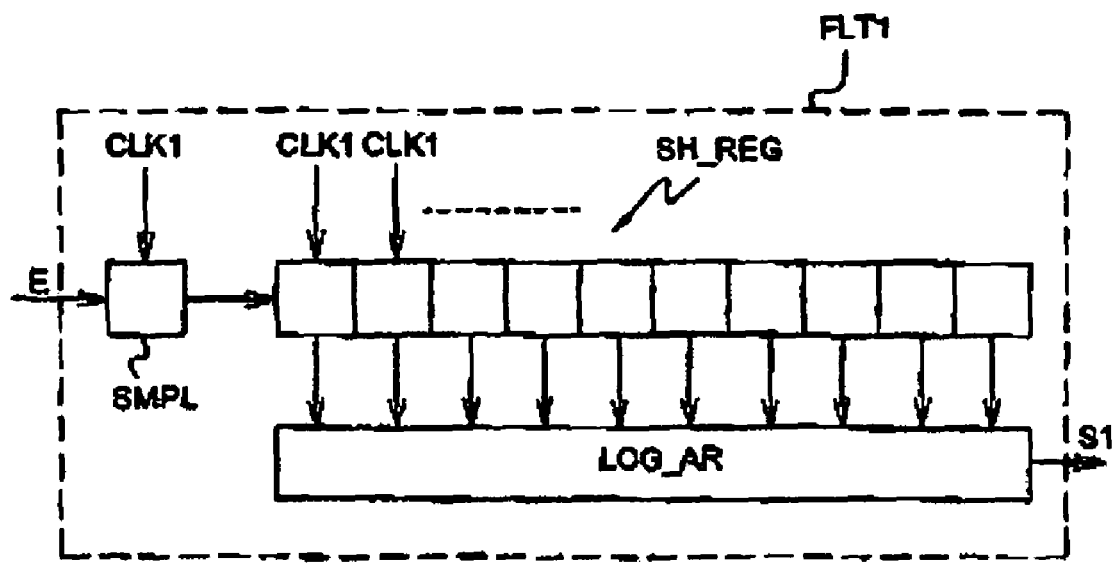
FIG. 5 shows an elementary diagram of a filter used in a device according to the invention.

Each filter FLT1 to FLT5, and for example filter FLT1 illustrated in FIG. 5, typically includes a sampler SMPL receiving the signal E to be decoded.

The sampler SMPL of each filter FLT1 to FLT5 is clocked to pick up a sample of the digital input signal E every time that the clock signal CLK1 to CLK5 received by this filter reaches a predetermined phase angle common to all filters, for example on each rising front of this clock signal.

The sampler SMPL of each filter FLT1 to FLT5 is followed by an offset register SH_REG to which this sampler outputs each sample of the input signal E, this offset register SH_REG itself being clocked by the clock signal CLK1 to CLK5 received by the filter to which it belongs and comprising N flip-flops in the case of symbols with N symbol elements such as A to K and A' to K'.

The N outputs from the offset register SH_REG of each filter FLT1 to FLT5 are connected in parallel with a combinational circuit LOG_AR of this filter that outputs a digital output signal S1 to S5, to the output of the filter and at each period T of the clock signal CLK1 to CLK5 received by the filter.

The combinational circuit LOG_AR of each filter FLT1 to FLT5 is designed in a manner known to those skilled in the art such that the output signal S1 to S5 produced by this filter FLT1 to FLT5 has an amplitude that depends directly on the correlation level between the sequence of the last N samples picked up by this filter FLT1 to FLT5 and the series of N symbol elements in one of the two symbols, for example the series of N elements A to K in the symbol coding a "1" bit in the digital signal E.

More precisely, if the N outputs from the offset register SH_REG of each filter FLT1 to FLT5 are denoted A" to k", the combinational circuit LOG_AR of this filter FLT1 to FLT5 outputs an output signal S1 to S5, the amplitude of which is equal to the number of elements with the same rank which have the same level 1 or –1 firstly in the ordered sequence A" to k" and secondly in the ordered sequence A to K, reduced by the number of elements with the same rank that have opposite levels in these two ordered sequences.

The analysis circuit ANL at the input of which the output signals S1 to S4 of the base filters FLT1 to FLT4 are output in parallel, is designed to satisfy essentially two functions.

Firstly, this analysis circuit ANL is designed to identify which of the M base filters FLT1 to FLT4 for which the output signal S1 to S4 has the greatest correlation or the greatest anti-correlation with one of these two symbols, during a time interval equal to at least the duration of a symbol such as A to K or A' to K', as the filter that is most closely locked onto the input signal E.

In practice, this analysis circuit ANL identifies which of the M base filters FLT1 to FLT4 for which the output signal S1 to S4 reaches the maximum absolute amplitude, or which even more advantageously has the greatest difference between its maximum amplitude and its minimum amplitude during the time interval considered.

Furthermore, this analysis circuit ANL is designed to specify the clock signal received by the base filter FLT1 to FLT4 previously identified as being the most closely locked onto the input signal E, as the optimum clock signal CLK5 to be output to the additional filter FLT5 for decoding the input signal E.

In practice, this analysis circuit ANL outputs a control signal n_5 to the clock circuit GEN_CLK identifying which of the M base filters FLT1 to FLT4 is most closely locked onto the input signal E, and the clock circuit GEN_CLK reacts to the control signal n_5 by outputting the same clock signal as the clock signal of the base filter identified by this control signal n_5 as an optimum clock signal CLK5, to the additional filter FLT5.

The signal S5 output by the additional filter FLT5 and for which the absolute value of the amplitude is equal to at least the amplitude of the output signals S1 to S4 of the base filters, is presented to the comparator CMP that compares it with two threshold values Vinf and Vsup, preferably adjustable and opposite.

The comparator CMP then outputs a "1" bit as a digital output signal S representing a decoded symbol of the input signal E when the amplitude of the output signal S5 of the additional filter FLT5 is greater than the upper threshold value Vsup, or a "0" bit when the amplitude of the output signal S5 of the additional filter FLT5 is less than the lower threshold value Vinf.

With the invention as described, and unlike the situation in prior art, it is possible to correctly decode a digital signal distorted by an eye closing problem and by transmission faults.

More precisely, in the case in which four base filters FLT1 to FLT4 are used, correct decoding can be obtained when the eye is only 25% open, and when the threshold values Vinf and Vsup are limited to 70% of the maximum theoretical amplitude of signals S1 to S4.

It is also possible to obtain correct decoding with an eye more than 75% closed, by increasing the number of base filters.

Figure 7:
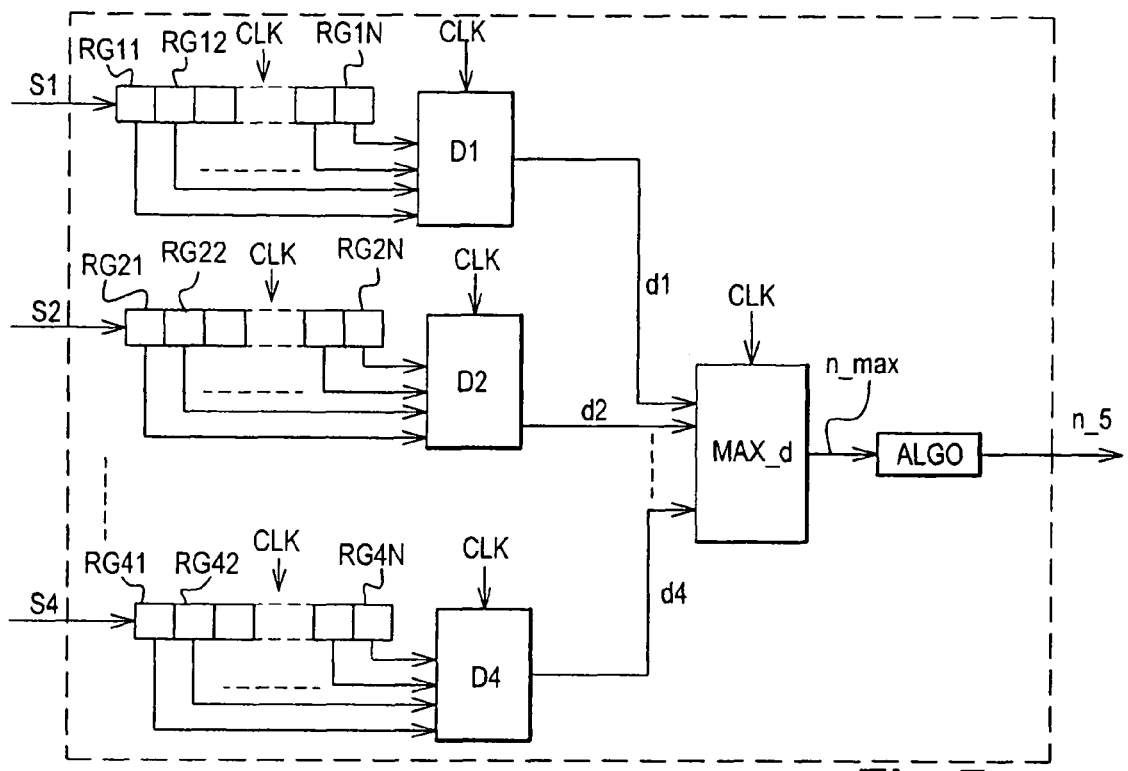
FIG. 7 shows a diagram illustrating a first possible embodiment of an analysis circuit that can be used in the device according to the invention.

FIG. 7 shows a first possible embodiment of the analysis circuit ANL.

For each of the M base filters FLT1 to FLT4, this analysis circuit ANL includes a series of N memory cells such as RG11 to RG1N for filter FLT1, RG21 to RG2N for filter FLT2, and RG41 to RG4N for filter FLT4, and a difference calculation module such as D1, D2, and D4.

Each series of memory cells receives the output signal such as S1 to S4 from the base filter FLT1 to FLT4 to which it is assigned, and is clocked at frequency F to make the successive values of this signal circulate more and more closely in the different memory cells like an offset register, except that each of these memory cells contains a value with several bits representing the amplitude of the corresponding signal S1 to S4, rather than a single bit.

Therefore, each series of N memory cells such as RG11-RG1N, RG21-RG2N, and RG41-RG4N permanently contains the last N successive samples of the output signal S1 to S4 from the base filter FLT1 to FLT4 to which this series of memory cells is assigned.

Each difference calculation module such as D1, D2 and D4 is designed to identify the largest and the smallest of the N values contained in the corresponding series RG11-RG1N, RG21-RG2N, and RG41-RG4N of N memory cells, and to calculate the difference such as D1, D2 and D4 between this greatest value and this smallest value.

The analysis circuit ANL also comprises a maximum identification module MAX_d capable of identifying the base filter FLT1 to FLT4 that supplied the largest of the M differences d1 to d4, and correspondingly to supply an output signal n_max identifying the clock signal CLK1 to CLK4 received by this same base filter.

The output signal n_max of the maximum identification module MAX_d could possibly be used as a control signal n_5 and therefore could be output directly to the clock signal GEN_CLK.

Figure 6:
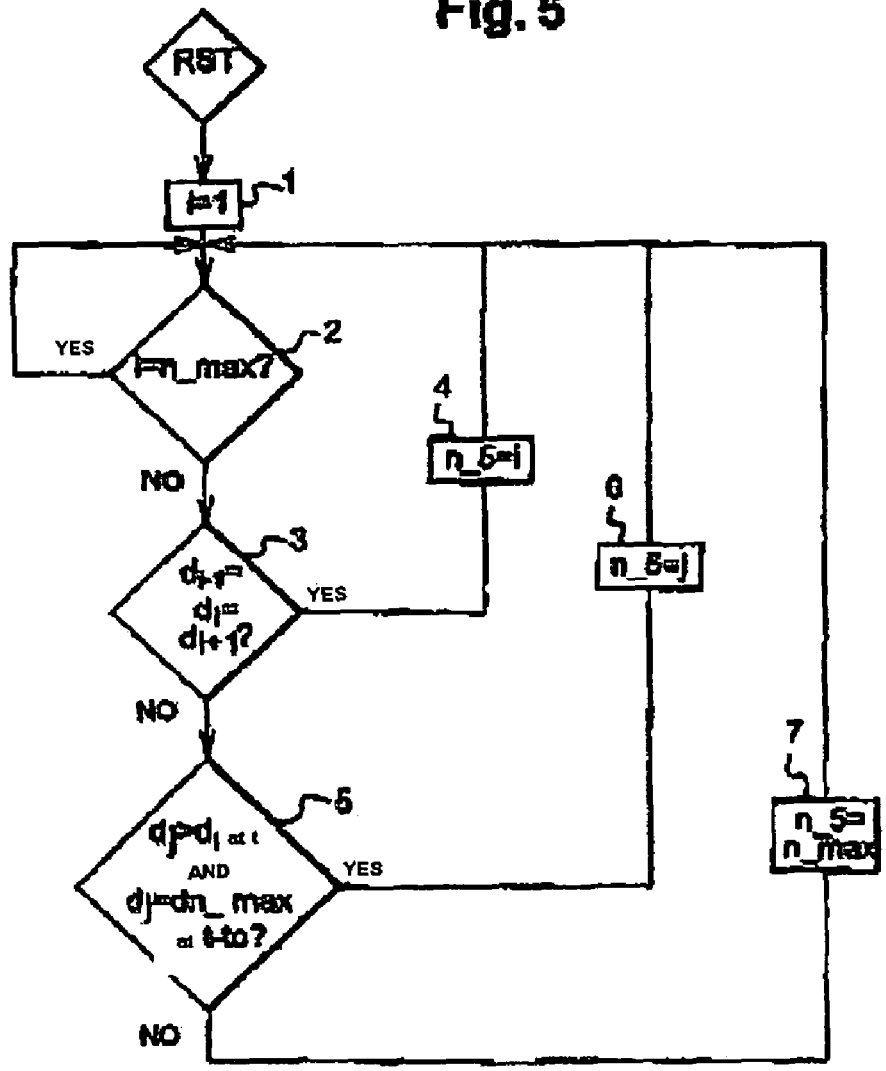
FIG. 6 is a flow chart showing one possible process for choosing the optimum clock signal.

However, to the extent that several of the differences d1 to d4 may be equal to the same maximum value simultaneously, and it is wise to avoid changing the frequency of the clock signal CLK5 output to the additional filter FLT5 too frequently, the analysis circuit ANL preferably comprises an algorithmic module ALGO to which the signal n_max is supplied, and which is capable of using the algorithm illustrated in FIG. 6.

After a reset operation RST, this algorithm chooses the clock signal CLK1 in advance as a clock signal CLK5, assigning the value 1 to the counter index "i" (operation 1).

Operation 2 consists of checking if the chosen clock signal corresponds to the clock signal identified by the n_max signal.

If it is, operation 2 loops back on itself.

If it is not, operation 3 is used to check if the difference di, in other words one of the differences d1 to d4 identified by the counter index "i", is equivalent to the difference di−1 and di+1 identified by the indexes "i−1" and "i+1" respectively.

If it is, operation 4 is used to choose the clock signal identified by the counter index "i" as the clock signal CLK5.

If it is not, operation 5 is used to check if there is a difference dj which is both greater than the difference di during the test carried out at the current instant t, and which would already be revealed as being equal to the difference dn_max during the previous test, made at the previous instant t-to.

If it is, operation 6 is used to choose the clock signal identified by the counter index "j" as the clock signal CLK5.

If it is not, operation 7 is used to choose the clock signal identified by the output signal n_max of the maximum identification module MAX_d, as the clock signal CLK5.

Figure 8:
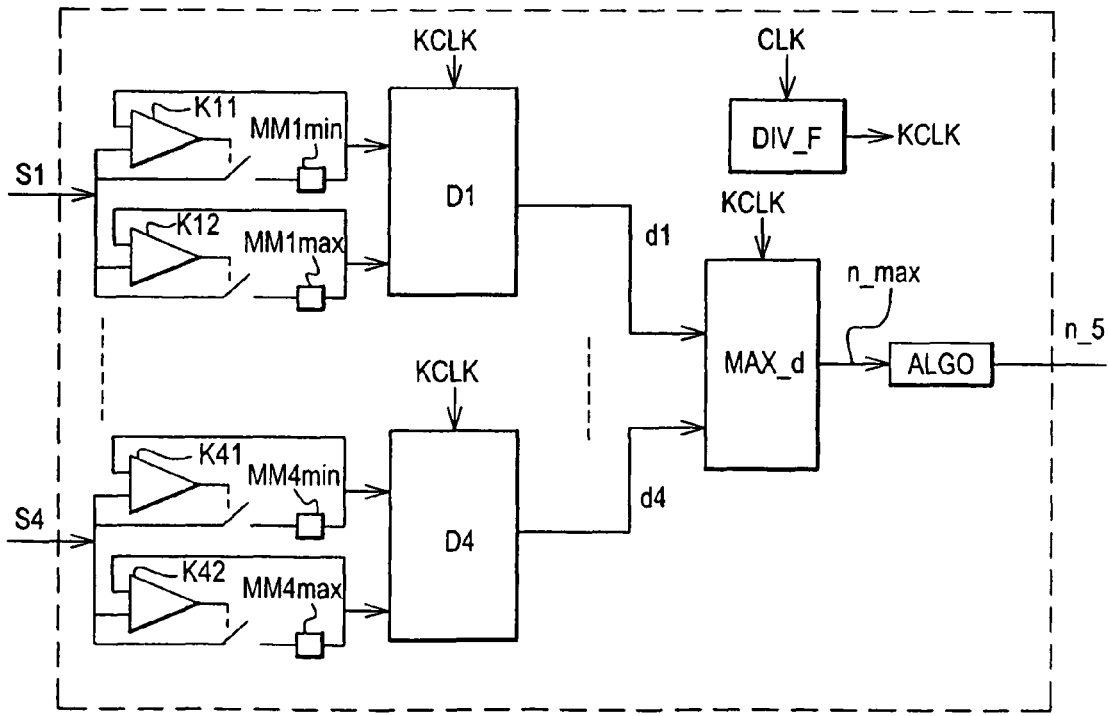
FIG. 8 is a diagram illustrating a second possible embodiment of an analysis circuit that can be used in the device according to the invention.

FIG. 8 shows a second possible embodiment of the analysis circuit ANL.

In this embodiment, the analysis circuit comprises firstly a frequency divider DIV_F capable of producing a clock signal KCLK with a frequency not more than F/N, starting from the clock signal CLK with frequency F.

For each of the M base filters FLT1 to FLT4, this analysis circuit ANL comprises a pair of memory cells such as MM1min, MM1max and MM4min, MM4max, each pair of memory cells being specifically dedicated to this base filter.

The first cell in each pair of memory cells, such as MM1min and MM4min, is used to store the last known minimum value of the amplitude of the output signal S1 to S4 of the filter FLT1 to FLT4 to which this pair of memory cells is dedicated.

This specific feature is symbolically represented by the use of a comparator such as K11 for cell MM1min and K41 for cell MM4Min, capable of comparing the last available value of the amplitude of the output signal S1 or S4 with the value stored in this cell MM1min or MM1min and only authorising replacement of the value memorised in this cell by the last available value of the amplitude of the output signal S1 or S4 if this available value is less than the memorised value.

The second cell in each pair of memory cells, such as MM1max and MM4max, is used to store the last known maximum value of the amplitude of the output signal S1 to S4 of the filter FLT1 to FLT4 to which this pair of memory cells is dedicated.

This specific feature is symbolically represented by the use of a comparator such as K12 for cell MM1max and K42 for cell MM4max capable of comparing the last available value of the amplitude of the output signal S1 to S4 with the value stored in this cell MM1max or MM4max, and only authorising replacement of the memorised value in this cell by the last available value of the amplitude of the output signal S1 or S4 if this last available value is greater than the memorised value.

For each of the M base filters FLT1 to FLT4, the analysis circuit ANL in FIG. 8 comprises a difference calculation module such as D1 or D4.

Each of these modules is functionally equivalent to modules D1, D2 and D4 in FIG. 7, except for the difference that it is clocked by the clock signal KCLK instead of being clocked by the CLK signal.

Therefore, at each cycle of the clock signal KCLK (FIG. 8), module D1 outputs a signal d1 representing the difference between the values memorised in the memory cells MM1min and MM1max, the module D4 similarly outputting a signal d4 representing the difference between the values memorised in the memory cells MM4min and MM4max.

Finally, the analysis circuit ANL in FIG. 8 comprises a maximum identification module MAX_d and an algorithm module ALGO functionally equivalent to the modules identified by the same references in FIG. 7, except that they are clocked by the clock signal KCLK instead of being clocked by the CLK signal.

As those skilled in the art will easily understand after reading the above, the embodiment of the analysis circuit ANL illustrated in FIG. 7 has the disadvantage compared with the embodiment illustrated in FIG. 8 that it will result in a larger integrated circuit, but it does have the advantage that it outputs an output signal n_5 at frequency F instead of outputting this signal at a frequency equal to not more than F/N.

The invention claimed is:

1. A decoding device for a transmission system using direct sequence spread spectrum, the device being structured to decode a digital input signal in base band composed of bits, each bit being represented by one of two symbols depending on its value, each symbol consisting of a series of N symbol elements distributed on one of two different levels and output at a fixed frequency with possible individual variations in phase and duration, and the N symbol elements of the first symbol being anti-correlated to the N corresponding symbol elements in the second symbol, the device comprising:
   a clock circuit;
   a plurality M of finite response base filters each of which is configured to receive the digital input signal, wherein the clock circuit outputs a plurality M of clock signals to the M base filters respectively, with a common frequency equal to the fixed frequency and corresponding phase shifts uniformly distributed between these M clock signals, and wherein the base filters are clocked to capture the corresponding samples of the input digital signal at instants at which their corresponding clock signals reach a determined phase angle common to all the filters, wherein each base filter outputs an output signal at its output at each period of its clock signal, the amplitude of the output signal being a function of the correlation level, representing a variable resemblance between the sequence of the last N samples picked up by this base filter and the series of N symbol elements of the first symbol;
   an analysis circuit connected to the output from each base filter and configured to identify which of the M base filters produces an output signal with a maximum amplitude and/or a minimum amplitude, over a time interval equal to at least the duration of a symbol, and by default to specify the clock signal received by the base filter as an optimum clock signal for decoding; and
   an additional finite response filter receiving the digital input signal parallel to the base filters, wherein the clock circuit is controlled by the analysis circuit to output the optimum clock signal to this additional filter, the additional filter also being clocked to pick up a sample of the digital input signal at the instants at which the optimum clock signal reaches the determined phase angle common to all filters, and to produce an output signal for which the absolute value of the amplitude is at least as large as the amplitude of the output signals of the base filters, at each period of the optimum clock signal.

2. The decoding device according to claim 1, wherein the analysis circuit uses the clock signal received by one base filter among the M base filters, chosen such that the difference between the maximum amplitude and minimum amplitude of the output signal is greatest, over a time interval equal to at least the duration of a symbol, as the optimum clock signal for decoding.

3. The decoding device according to claim 1 further comprising a comparator installed on the output of the additional filter, capable of comparing the amplitude of the output signal of the additional filter with a lower threshold value and an upper threshold value, and outputting a first bit as the digital output signal representing a decoded symbol of the input signal when the amplitude of the output signal from the additional filter is greater than the value of the upper threshold, and a second bit when the amplitude of the output signal from the additional filter is less than the value of the lower threshold.

4. The decoding device according to claim 3, wherein the values of the upper and lower thresholds of the comparator are adjustable.

5. The decoding device according to claim 1 wherein the analysis circuit includes at least N·M memory cells to store at least the N last successive samples of the output signal from each of the M base filters, this analysis circuit thus having the minimum value and the maximum value of the amplitude of the output signal from each base filter over the duration of a symbol, at the end of each period corresponding to the fixed frequency.

6. The decoding device according to claim 1 wherein the analysis circuit comprises at least M pairs of memory cells, each of which is specifically dedicated to one of the M base filters, a first cell in each pair of cells being used by the analysis circuit to store the last known minimum value of the amplitude of the output signal from the filter to which this pair of cells is dedicated, and a second cell in each pair of cells is used by the analysis circuit to store the last known maximum value of the amplitude of the output signal from the filter to which this pair of cells is dedicated, the analysis circuit thus having the minimum value and the maximum value of the amplitude taken on by the output signal from each base filter over the duration of a symbol, at the end of each period in a series of successive observation periods each of which is equal to at least the duration of a symbol.

7. The decoding device according to claim 1, wherein the plurality M of finite response base filters includes at least four base filters, the clock signal output to each base filter having a phase advance and a phase delay respectively equal to not more than 90 degrees with respect to the clock signals output to two other base filters.

8. A method of decoding a digital input signal in base band composed of bits, each bit being represented by one of two symbols depending on its value, each symbol consisting of a series of N symbol elements distributed on one of two different levels and output at a fixed frequency with possible individual variations in phase and duration, and the N symbol elements of the first symbol being anti-correlated to the N corresponding symbol elements in the second symbol, the method comprising:

generating a plurality M of clock signals with a common frequency equal to the fixed frequency and corresponding phase shifts uniformly distributed between the M clock signals;

providing the input signal to each of a plurality M of finite response base filters;

clocking the plurality M of base filters with corresponding clock signals from the plurality M of clock signals to capture corresponding samples of the input digital signal at instants at which their corresponding clock signals reach a determined phase angle common to all the filters in the plurality M of filters, wherein each base filter outputs an output signal at each period of its clock signal, the amplitude of the output signal being a function of a correlation level, representing a variable resemblance between a sequence of the last N samples picked up by the respective base filter and a series of N symbol elements of the first symbol;

identifying, based on the output from each filter in the plurality M of base filters, which of the M base filters produces an output signal with a maximum amplitude and/or a minimum amplitude, over a time interval equal to at least the duration of a symbol;

specifying the clock signal received by the identified base filter as a default clock signal for decoding;

providing the digital input signal to an additional finite response filter parallel to the plurality M of base filters;

clocking the additional finite response filter with the default clock signal for decoding to pick up a sample of the digital input signal at the instants at which the optimum clock signal reaches the determined phase angle common to all filters; and producing an output signal for which an absolute value of an amplitude is at least as large as an amplitude of the output signals of the base filters, at each period of the default clock signal.

9. The method of claim 8, wherein the identifying comprising selecting a clock signal received by one base filter among the M base filters such that the difference between the maximum amplitude and minimum amplitude of the output signal is greatest, over a time interval equal to at least the duration of a symbol, as an optimum clock signal for decoding.

10. The method of claim 8, further comprising:
comparing an output of the additional filter with a lower threshold value and an upper threshold value, and outputting a first bit as a digital output signal representing a decoded symbol of the input signal when the amplitude of the output signal from the additional filter is greater than the value of the upper threshold, and a second bit when the amplitude of the output signal from the additional filter is less than the value of the lower threshold.

11. The method of claim 10, further comprising:
adjusting a value of at least one of the thresholds.

12. The method of claim 8, further comprising:
storing successive samples of the output signals from each of the M base filters.

13. A system to decode a digital signal in base band composed of bits, each bit being represented by one of two symbols depending on its value, each symbol consisting of a series of N symbol elements distributed on one of two different levels and output at a fixed frequency with possible individual variations in phase and duration, and N symbol elements of the first symbol being anti-correlated to N corresponding symbol elements in the second symbol, the system comprising:

a clock generator configured to generate a plurality M of clock signals with a common frequency equal to the fixed frequency and corresponding phase shifts uniformly distributed between the M clock signals;

a plurality M of finite response base filters each configured to receive the digital input signal and clocked by a respective clock signal from the plurality M of clock signals to corresponding samples of the input digital signal at instants at which the corresponding clock signals reaches a determined phase angle common to all the filters, wherein each base filter is configured to produce an output signal at each period of its clock signal, the amplitude of the output signal being a function of a correlation level, representing a variable resemblance between a sequence of the last N samples picked up by the respective base filter and a series of N symbol elements of the first symbol;

an analysis circuit coupled to the outputs of each base filter and configured to identify which of the M base filters produces an output signal with a maximum amplitude and/or a minimum amplitude, over a time interval equal to at least the duration of a symbol, and to set the clock signal received by the identified base filter as a default clock signal for decoding; and an additional finite response filter configured to receive the digital input signal and parallel to the plurality M of base filters and to receive the default clock signal, the additional filter also being clocked to pick up a sample of the digital input signal at instants at which the default clock signal reaches the determined phase angle common to all filters, and to produce an output signal for which an absolute value of an amplitude is at least as large as an amplitude of the output signals of the base filters, at each period of the default signal.

14. The system of claim 13, further comprising:

a comparator configured to compare the amplitude of the output signal of the additional filter with a lower threshold value and an upper threshold value, and to output a first bit as the digital output signal representing a decoded symbol of the input signal when the amplitude of the output signal from the additional filter is greater than the value of the upper threshold, and a second bit when the amplitude of the output signal from the additional filter is less than the value of the lower threshold.

15. The system of claim 14, wherein the value of at least one of the upper and lower thresholds of the comparator is adjustable.

16. The system of claim 13 wherein the analysis circuit includes at least N times M memory cells configured to store at least N last successive samples of the output signal from each of the M base filters, this analysis circuit thus having the minimum value and the maximum value of the amplitude of the output signal from each base filter over the duration of a symbol, at the end of each period corresponding to the fixed frequency.

17. The system of claim 13 wherein the analysis circuit comprises at least M pairs of memory cells, each of which is specifically dedicated to one of the M base filters, a first cell in each pair of cells configured to store a last known minimum value of the amplitude of the output signal from the filter to which the pair of cells is dedicated, and a second cell in each pair of cells configured to store a last known maximum value of the amplitude of the output signal from the filter to which this pair of cells is dedicated.

18. The system of claim 13, wherein the plurality M of finite response base filters includes at least four base filters, the clock signal output to each base filter having a phase advance and a phase delay respectively equal to not more than 90 degrees with respect to the clock signals output to two other base filters.

19. A system to decode a digital signal in base band composed of bits, each bit being represented by one of two symbols depending on its value, each symbol consisting of a series of N symbol elements distributed on one of two different levels and output at a fixed frequency with possible individual variations in phase and duration, and N symbol elements of the first symbol being anti-correlated to N corresponding symbol elements in the second symbol, the system comprising:

means for generating a plurality M of clock signals with a common frequency equal to the fixed frequency and corresponding phase shifts uniformly distributed between the M clock signals;

means for receiving the digital input signal and the plurality M of clock signals, capturing a plurality M of corresponding samples of the input digital signal at instants at which the corresponding clock signals reach a determined common phase angle, and outputting a plurality M of output signals at each period of each clock signal, the amplitude of the respective output signals being a function of a correlation level, representing a variable resemblance between a sequence of the last N samples for the respective clock signal and a series of N symbol elements of the first symbol, wherein the means for receiving comprises a plurality M of finite response base filters each configured to receive the digital input signal and clocked by a respective clock signal from the plurality M of clock signals, and an additional finite response filter configured to receive the digital input signal and parallel to the plurality M of base filters; and means for analyzing the plurality of output signals from the means for receiving and for identifying default clock signal for decoding based on the output signals.

20. The system of claim 19, further comprising:

means for comparing an output of the additional filter with a lower threshold value and an upper threshold value, and outputting a first bit as the digital output signal representing a decoded symbol of the input signal when the amplitude of the output signal from the additional filter is greater than the value of the upper threshold, and a second bit when the amplitude of the output signal from the additional filter is less than the value of the lower threshold.

21. The system of claim 20 further comprising:

means for adjusting the values of the upper and lower thresholds of the comparator.

22. The system of claim 19 wherein the means for analyzing includes a memory configured to store at least N last successive samples of each of the plurality of M output signals.

* * * * *